US008369296B2

(12) United States Patent
Armstrong et al.

(10) Patent No.: US 8,369,296 B2
(45) Date of Patent: *Feb. 5, 2013

(54) DISTRIBUTED LINK AGGREGATION

(75) Inventors: William J. Armstrong, Rochester, MN (US); Claude Basso, Raleigh, NC (US); Josep Cors, Rochester, MN (US); David R. Engebretsen, CannonFalls, MN (US); Kyle A. Lucke, Oronoco, MN (US); Jeffrey J. Lynch, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 242 days.

This patent is subject to a terminal disclaimer.

(21) Appl. No.: 12/767,174

(22) Filed: Apr. 26, 2010

(65) Prior Publication Data

US 2011/0261827 A1 Oct. 27, 2011

(51) Int. Cl.
*H04W 4/00* (2009.01)
(52) U.S. Cl. ............... 370/338; 370/392; 370/401
(58) Field of Classification Search .......... 370/254, 370/338, 389, 390, 392, 401
See application file for complete search history.

(56) References Cited

U.S. PATENT DOCUMENTS

| 6,802,068 | B1 | 10/2004 | Guruprasad |
| 7,751,416 | B2 | 7/2010 | Smith et al. |
| 7,756,027 | B1 | 7/2010 | Reddy et al. |
| 7,992,149 | B2 | 8/2011 | Carollo et al. |
| 8,194,534 | B2 | 6/2012 | Pandey et al. |
| 2003/0037163 | A1 | 2/2003 | Kitada et al. |
| 2004/0037279 | A1* | 2/2004 | Zelig et al. ............ 370/390 |
| 2006/0023708 | A1 | 2/2006 | Snively et al. |
| 2006/0149886 | A1* | 7/2006 | Chen et al. ............ 710/311 |
| 2006/0248158 | A1 | 11/2006 | Ha et al. |
| 2007/0067432 | A1 | 3/2007 | Tarui et al. |
| 2007/0260910 | A1 | 11/2007 | Jain et al. |
| 2007/0299987 | A1 | 12/2007 | Parker et al. |
| 2008/0056300 | A1 | 3/2008 | Williams |
| 2008/0159260 | A1 | 7/2008 | Vobbilisetty et al. |
| 2008/0159277 | A1* | 7/2008 | Vobbilisetty et al. ...... 370/357 |
| 2008/0275975 | A1 | 11/2008 | Pandey et al. |
| 2009/0161692 | A1 | 6/2009 | Hirata et al. |
| 2009/0252181 | A1 | 10/2009 | Desanti |
| 2009/0254677 | A1 | 10/2009 | Desanti |
| 2009/0265501 | A1 | 10/2009 | Uehara et al. |
| 2009/0276526 | A1 | 11/2009 | Carlson et al. |
| 2009/0323518 | A1* | 12/2009 | Rose et al. ............ 370/223 |

(Continued)

FOREIGN PATENT DOCUMENTS

WO WO 2006 093929 A2 9/2006
WO WO 2009 085536 A2 7/2009

OTHER PUBLICATIONS

IBM U.S. Appl. No. 12/751,187 entitled "Data Frame Forwarding Using a Multitiered Distributed Virtual Bridge Hierarchy," filed Mar. 31, 2010 by William J. Armstrong et al.

(Continued)

*Primary Examiner* — Jung Park
(74) *Attorney, Agent, or Firm* — Toler Law Group

(57) ABSTRACT

Systems and methods to forward data frames are described. A particular method may include generating a plurality of management frames at a controlling bridge. The management frames may include routing information. The plurality of management frames may be communicated to a plurality of bridge elements coupled to a plurality of server computers. The plurality of bridge elements are each configured to selectively forward a plurality of data frames according to the routing information.

20 Claims, 6 Drawing Sheets

U.S. PATENT DOCUMENTS

| | | | |
|---|---|---|---|
| 2010/0067374 | A1 | 3/2010 | Elangovan et al. |
| 2010/0085966 | A1 | 4/2010 | Samuels et al. |
| 2010/0128605 | A1 | 5/2010 | Chavan et al. |
| 2010/0150174 | A1 | 6/2010 | Bhide et al. |
| 2010/0257269 | A1 | 10/2010 | Clark |
| 2011/0061094 | A1 | 3/2011 | Salkewicz |
| 2011/0069710 | A1 | 3/2011 | Naven et al. |
| 2011/0085557 | A1 | 4/2011 | Gnanasekaran et al. |
| 2011/0153715 | A1 | 6/2011 | Oshins et al. |
| 2011/0243134 | A1 | 10/2011 | Armstrong et al. |
| 2011/0243146 | A1 | 10/2011 | Armstrong et al. |
| 2011/0258340 | A1 | 10/2011 | Armstrong et al. |
| 2011/0258641 | A1 | 10/2011 | Armstrong et al. |
| 2011/0261687 | A1 | 10/2011 | Armstrong et al. |
| 2011/0261815 | A1 | 10/2011 | Armstrong et al. |
| 2011/0261826 | A1 | 10/2011 | Armstrong et al. |
| 2011/0261827 | A1 | 10/2011 | Armstrong et al. |
| 2011/0262134 | A1 | 10/2011 | Armstrong et al. |
| 2011/0320671 | A1 | 12/2011 | Armstrong et al. |

OTHER PUBLICATIONS

IBM U.S. Appl. No. 12/751,249 entitled "Data Frame Forwarding Using a Distributed Virtual Bridge," filed Mar. 31, 2010 by William J. Armstrong et al.

IBM U.S. Appl. No. 12/763,306 entitled "Distributed Virtual Bridge Management," filed Apr. 20, 2010 by William J. Armstrong et al.

IBM U.S. Appl. No. 12/763,323 entitled "Remote Adapter Configuration," filed Apr. 20, 2010 by William J. Armstrong et al.

IBM Patent Application entitled "Multicasting Using a Multitiered Distributed Virtual Bridge Hierarchy," filed Apr. 26, 2010 by William J. Armstrong et al.

IBM Patent Application entitled "Address Data Learning and Registration Within a Distributed Virtual Bridge," filed Apr. 26, 2010 by William J. Armstrong et al.

IBM Patent Application entitled "Priority Based Flow Control Within a Virtual Distributed Bridge Environment," filed Apr. 26, 2010 by William J. Armstrong et al.

Hufferd, John L., "Proxy Based Shortcut, Hufferd Enterprises", Oct. 7, 2009, (21 pgs).

Cisco Systems, "The Adaptive Architecture for the Data Center Network", 2007, (3 pgs).

Cisco Systems, "Integrating the Cisco Catalyst Blade Switch 3130 for Dell PowerEdge M1000e Blade Enclosure into the Cisco Data Center Network Architecture—Design Guide," Oct. 2007, retrieved from the Internet: http://cisco.com/en/US/prod/collateral/switches/ps6746/ps8742/ps8764/white_paper_c07-443792.pdf [retrieved on Sep. 21, 2011], (29 pgs).

* cited by examiner

DISTRIBUTED LINK AGGREGATION

I. FIELD OF THE DISCLOSURE

The present disclosure relates generally to data communications, and more specifically, to routing data frames within a highly integrated computer network.

II. BACKGROUND

Server computers are continuously managed to enable access to shared switches and other traffic routing resources. For example, contention for routing resources may exist when server computers are housed within racks for space and connectivity considerations, such as in a blade server computer arrangement. The server computers may experience transmission bottlenecks and delays when forwarding data frames through centralized switches, such as shared top of rack switches.

To illustrate, FIG. 1 shows a conventional blade server computer system 100. The system 100 includes a plurality of server computers 106-125 housed within racks 102, 104 and arranged into chassis 138, 140, 142, and 144. An illustrative server computer 106 may include a half-width information technology element (ITE) blade server computer.

Data frame communications between the server computers 106-125 housed within different chassis 138, 140, 142, 144 or racks 102, 104 may be referred to as east-west connectivity. For example, the server computer 111 of a first chassis 140 may forward a data frame to the server computer 106 of another chassis 138 via a path 164. The path 164 includes a chassis switch 154 and a top of rack switch (TOR) 158. The chassis switch 154 and the top of rack switch 158 may route the data frame based upon a media access control (MAC) address.

When the server computer 111 of the rack 102 forwards a data frame to the server computer 123 of the rack 104, the data frame travels through paths 166 and 168. The paths 166 and 168 include the top of rack switch 158 associated with the rack 102, an end of rack switch (EOR) 162, and a top of rack switch 160 associated with the rack 104. The top of rack switch 158 is again used when the server computer 111 attempts north-south connectivity (i.e., internal to external data frame communication) through paths 166 and 170. Because the data frames in the above examples are all routed through the top of rack switches 158, 160, a potential bottleneck scenario can result.

Increasing the number of switches and associated connections to accommodate additional traffic may present configuration and management challenges, as well as increase hardware costs and latency. For example, an increased number of switches may burden a centralized switch used to control workload balance and data frame distribution.

III. SUMMARY OF THE DISCLOSURE

In a particular embodiment, an apparatus is disclosed that includes a plurality of server computers. A plurality of bridge elements may be coupled to the plurality of server computers. The plurality of bridge elements may each be configured to selectively forward a plurality of data frames according to received routing information. A controlling bridge coupled to the plurality of bridge elements may be configured to provide the routing information to the plurality of bridge elements.

In another embodiment, a method of routing a data frame may include generating a plurality of management frames at a controlling bridge. The management frames may include routing information. The plurality of management frames may be communicated to a plurality of bridge elements coupled to a plurality of server computers. The plurality of bridge elements are each configured to selectively forward a plurality of data frames according to the routing information.

In another embodiment, a program product may include program code executable at a controlling bridge to generate a plurality of management frames that include routing information. The plurality of management frames may be communicated to a plurality of bridge elements coupled to a plurality of server computers. The plurality of bridge elements may each be configured to selectively forward a plurality of data frames according to the routing information. The program product may further include a computer readable storage medium bearing the program code.

At least one of the embodiments may facilitate workload balancing by distributing routing and link aggregation processes. The distributed routing may reduce potential bottlenecks and facilitate efficient processing. An embodiment of a system may be scalable to include hundreds or more server computers with direct connectivity.

Features that characterize embodiments of the disclosure are set forth in the claims annexed hereto and forming a further part hereof. However, for a better understanding of embodiments of the disclosure, and of the advantages and objectives attained through its use, reference should be made to the Drawings and to the accompanying descriptive matter in which there are described exemplary embodiments of the disclosure.

IV. BRIEF DESCRIPTION OF THE DRAWINGS

V. DETAILED DESCRIPTION

Figure 1:
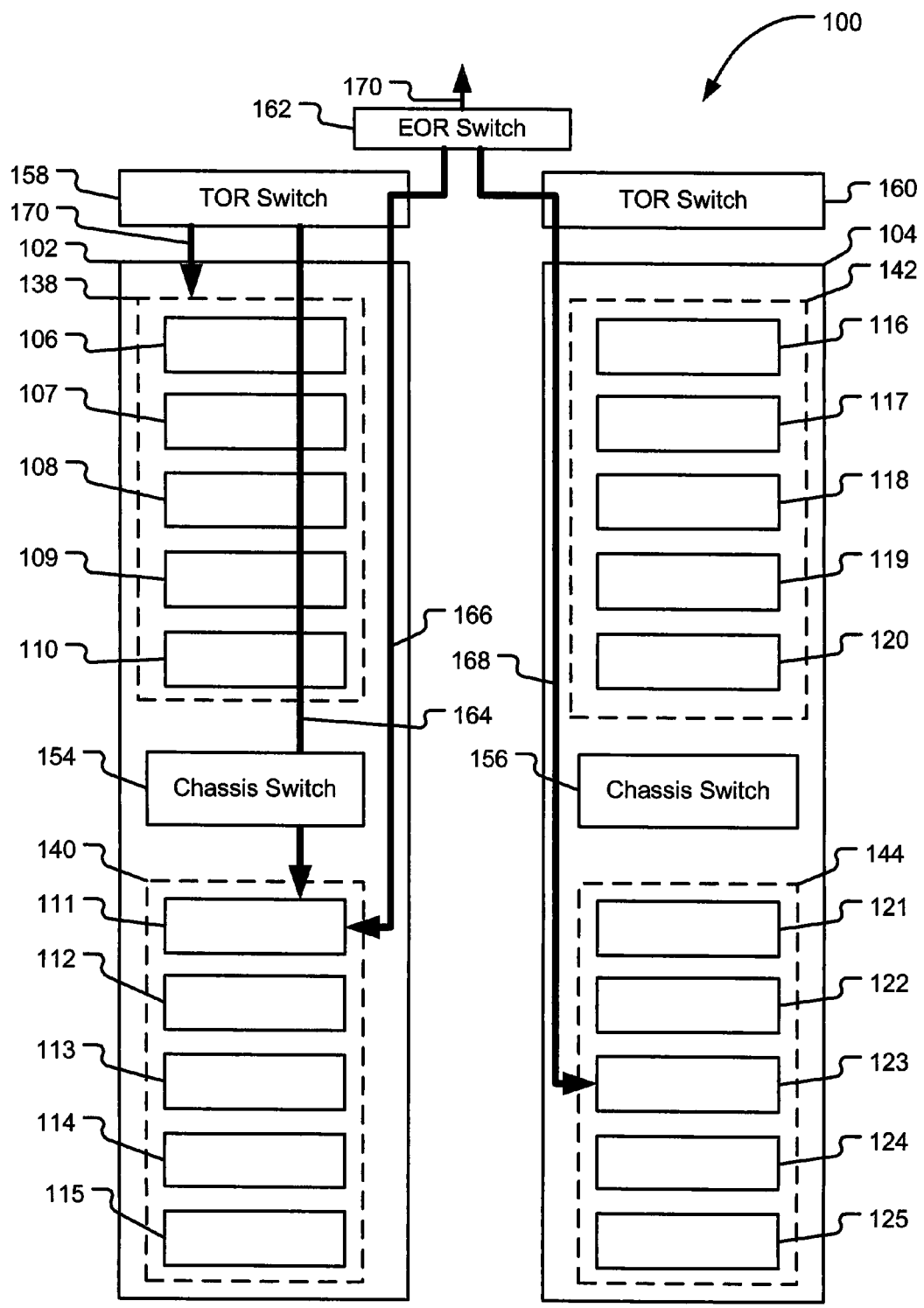
FIG. 1 is a block diagram of a prior art computing system that includes racks of blade server computers.

Data frame communication may be improved by including a distributed aggregator component comprising multiple bridge elements positioned within a highly integrated and scalable network. The distributed bridge elements may comprise part of a distributed virtual bridge that spans multiple server computers. The bridge elements may be configured to perform Layer-2 switching functions. The bridge elements may accomplish operational and frame-forwarding decisions in parallel by distributing load balancing determinations.

Groupings of ports may be controlled and managed using the distributed virtual bridge. The port groups may span multiple, physically separated server computers to provide external bandwidth. Port group sub-link selection may be performed at the bridge elements. Port group sub-links may use the same external links. Port group and link operational status may be automatically updated within the distributed environment. The link aggregation of port groups may be distributed using multiple instances of bridge elements. A bridge element may include a link table with primary and secondary port group trunks.

A controlling bridge may control access to external links and may execute Layer-2 (e.g., Ethernet) control plane functions to manage a set of bridge elements. For example, the bridge elements of the distributed virtual bridge may be interconnected and managed using management frames generated by the controlling bridge. The controlling bridge may communicate with or otherwise be coupled (remotely or directly) to each bridge element of the distributed virtual bridge. The controlling bridge may program the bridge elements using management frames that include a configuration protocol. Link aggregation setup, configuration, and operational control may be accomplished by the controlling bridge.

The controlling bridge may communicate routing information to bridge elements using sub-links in a specific port group. The routing information may include a routing algorithm that enables the bridge elements to execute link and port aggregation. An illustrative routing algorithm may include a workload balancing component. The controlling bridge may further monitor link states of each sub-link of an aggregated port group. The controlling bridge may inform some or all of the bridge elements using sub-links in a specific port group of any changes affecting the state of a link.

Selection of a sub-link may be based upon a link state, a load balancing consideration, and address data of a frame to be transmitted, among other considerations. Illustrative address data may include at least one of a Media Access Control (MAC) address, a source port identifier, a source address, a destination address, and an Internet Protocol (IP) address, among other identifying data.

The controlling bridge may exchange protocol messages with one or more bridge elements and may form one or more of the port groups. The primary controlling bridge may communicate configuration and sub-link routing information to each bridge element that will be forwarding data frames to a specific port group. For instance, the primary controlling bridge may communicate address data and one or more routing algorithms to a bridge element.

After the primary controlling bridge has communicated the routing information to the bridge element, the bridge element may process and forward each received data frame directly to the appropriate external physical uplink port. Each data frame may not travel through a common aggregator to be serially processed. The routing of each data frame may be accomplished at the bridge elements in parallel. This parallel processing may facilitate increased throughput.

An aggregated link failure may be signaled by a controlling bridge to an ingress, or north, bridge element. The north bridge element may be coupled to an adapter. A link state change may be detected by a south bridge element. A south bridge element may be coupled to an external uplink (e.g., to an Ethernet network). The south bridge element may transmit a notification to a north bridge element for each discarded data frame. A link-up notification or link-down notification may be communicated to a local controlling bridge from the south bridge element. The controlling bridge may broadcast the link status to some or all of the bridge elements. The bridge elements may update their link table according to the notifications. The bridge elements may subsequently account for the link status during link selection. In the case of a detected faulty primary port group, the system may fail over to a secondary port group. In this manner, the bridge elements and controlling bridge(s) may work in combination to increase routing performance and reduced administrative workload.

Figure 2:
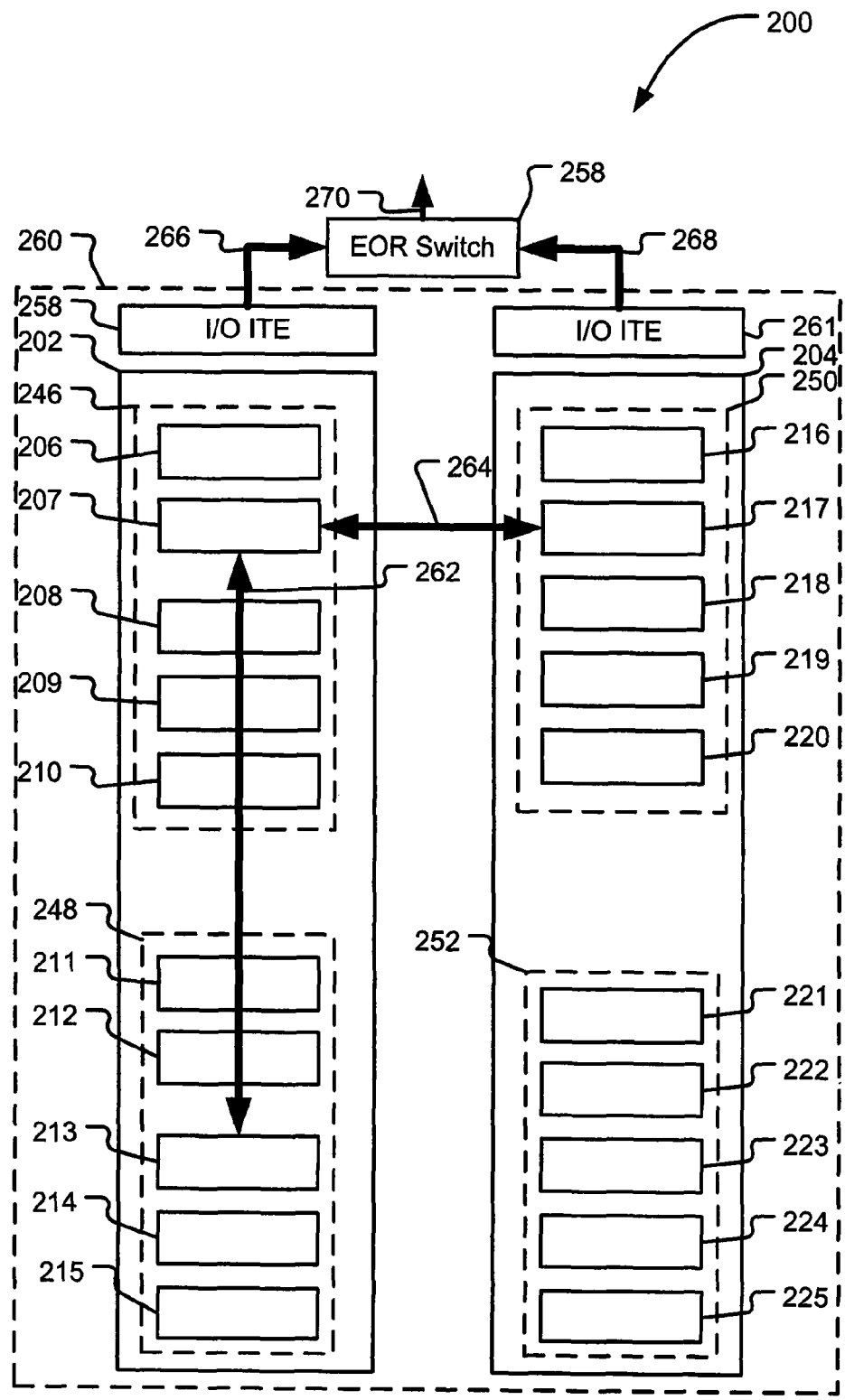
FIG. 2 is a block diagram of an embodiment of a highly integrated computing system configured to allow direct communication between server computers housed within different racks and chassis of blade server computers.

Turning particularly to the drawings, FIG. 2 shows an illustrative embodiment of a highly integrated system 200 configured to forward data frames using a distributed virtual bridge 260. The distributed virtual bridge 260 may extend across server computers 206-225, chassis 246, 248, 250, 252, and racks 202, 204 to provide data link layer (e.g., Layer 2) switching between bridge elements. The bridge elements may provide a frame-based, Ethernet-like interface. The interface may facilitate lossless, point-to-point, in-order frame delivery between server computers 206-225 of different racks 202, 204 or chassis 246, 248, 250, 252 (i.e., east-west connectivity) with reduced redundancy and latency.

The system 200 further includes an end-of-rack switch 270 and input/output (I/O) server ITEs 258, 261 that enable north-south connectivity. The I/O server ITEs 258, 261 may enable uplink connectivity to the external Ethernet network (or other network) for the server computers 206-225 housed within the racks 202, 204.

An arrow 264 of FIG. 2 represents direct east-west connectivity and the flow of data frames between server computers located in different racks 202, 204 of the system 200 (e.g., without using a top of rack or chassis switch). An arrow 262 represents direct east-west connectivity across different chassis 246, 248 of the rack 202.

The system 200 of FIG. 2 may enable direct connectivity between server computers of different racks or chassis. To accommodate the relatively high level of system integration, distributed bridge elements may be programmed to independently route data frames. The distribution of routing processes may streamline the routing of data frames and facilitate scalability. The bridge elements and distributed routing within the distributed virtual bridge 260 may reduce contention for resources and increase data frame traffic flow.

Figure 3:
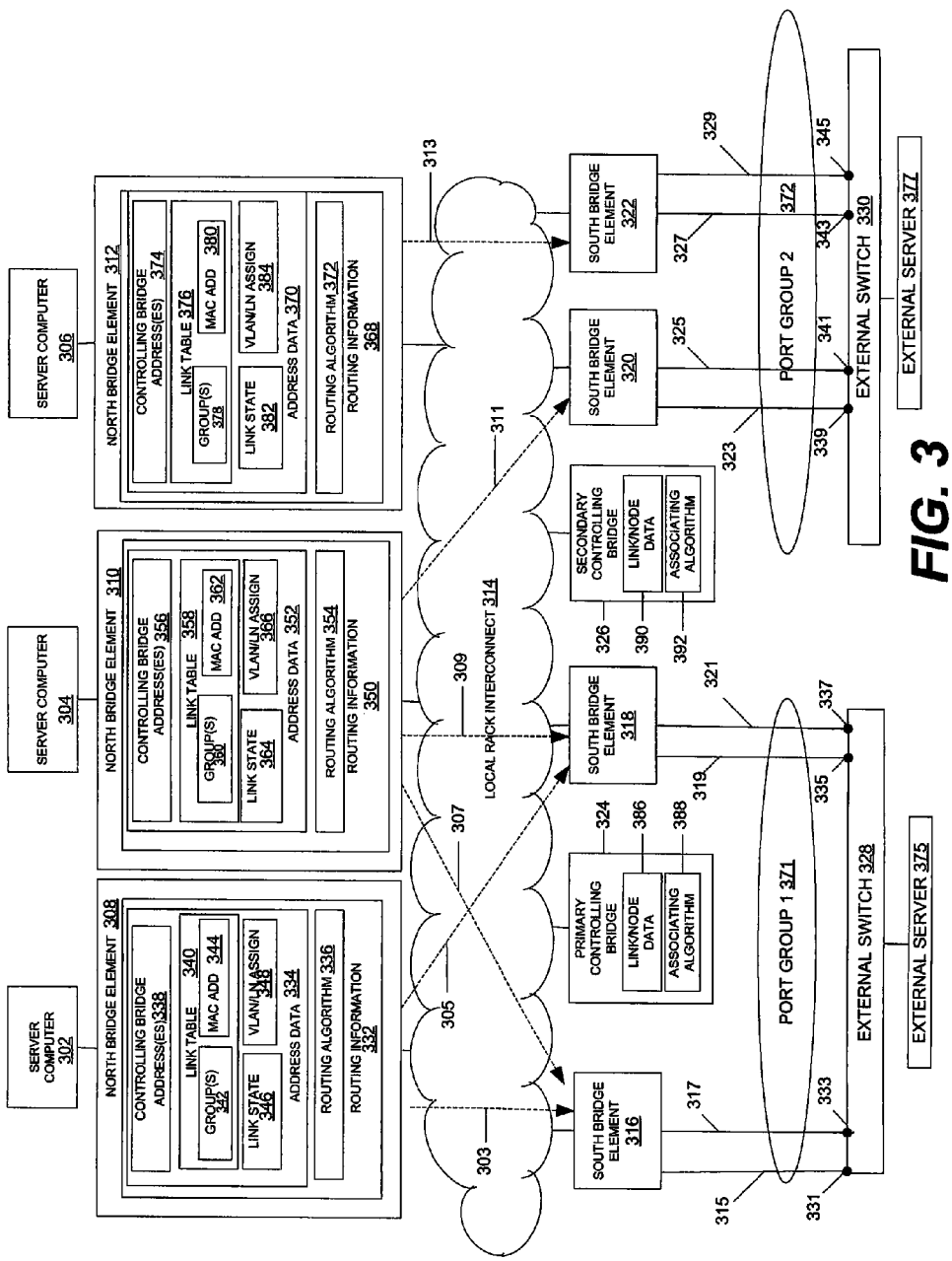
FIG. 3 is a block diagram of a particular embodiment of a system configured to route data frames in a distributed manner.

FIG. 3 shows a particular illustrative embodiment of a highly integrated computer system 300 that includes north bridge elements 308, 310, and 312 configured to route data frames in a distributed manner. The system 300 includes server computers 302, 304, and 306. The server computers 302, 304, and 306 may be similar to the 206-208 of FIG. 2. The server computer 302 may be coupled to the north bridge element 308. The server computer 304 may be coupled to the north bridge element 310, and the server computer 306 may be coupled to the north bridge element 312.

The north bridge element 308 may be coupled to a local rack interconnect 314. The other ingress (i.e., north) bridge elements 310, 312 may additionally be coupled to the local rack interconnect 314. The local rack interconnect 314 may further be coupled to south bridge elements 316, 318, 320, and 322. The local rack interconnect 314 may facilitate point-to-point connections between the bridge elements 308, 310, 312, 316, 318, 320, and 322 without frame loss and with in-order frame delivery.

A primary controlling bridge 324 may be coupled to the local rack interconnect 314. A secondary controlling bridge 326 may additionally be coupled to the local rack interconnect 314. The south bridge element 316 may be coupled to an external switch 328, which is coupled to an external server 375. More particularly, a link 315 may couple the south bridge element 316 to a port 331 of the external switch 328. The south bridge element 316 may be coupled to a port 333 of the external switch 328 via a link 317.

The south bridge element 318 may be coupled to a port 335 of the external switch 328 via a link 319. A link 321 may connect the south bridge element 318 to a port 337 of the external switch 328. The south bridge element 320 may be coupled to an external switch 330 at ports 339 and 341 via links 323 and 325, respectively. The south bridge element 322 may be coupled to the external switch 330 at ports 343 and 345 via links 327 and 329, respectively. The ports 331, 333, 335, and 337 may be associated with a first port group 371. The ports 339, 341, 343, and 345 may be associated with a second port group 373. The external switch 330 may be coupled to an external server 377.

The north bridge element 308 may include routing information 332. The routing information may be communicated by the primary controlling bridge 324 and may include address data 334 and a routing algorithm 336. The routing algorithm 336 may include instructions used to route data frames to be transmitted from the north bridge element 308.

The address data 334 may be associated with the north bridge element 308 by the primary controlling bridge 324. The address data 334 may include controlling bridge addresses 338 and a link table 340. Illustrative controlling bridge addresses 338 may correspond to MAC addresses of the primary controlling bridge 324 and of the secondary controlling bridge 326. The link table 340 of the north bridge element 308 may include port group information 342 and MAC addresses 344. The port group information 342 may include information pertaining to the first port group 371 assigned or otherwise associated with the north bridge element 308. The MAC addresses 344 may include addresses of south bridge elements 316, 318, 320, and 322, among other components of the system 300.

The address data 334 of the north bridge element 308 may further include link state information 346. The link state information 346 may include status information pertaining to various links and ports that are associated with the north bridge element 308. The address data 334 may also include virtual large area network (VLAN) and logical network (LN) assignments 348 associated with the north bridge element 308. For example, the VLAN and logical network assignments 348 may be used by the north bridge element 308 to route data frames. Through the north bridge element 308, VLANs and logical networks may be further associated with port groups 371, 372.

The north bridge element 310 may include routing information 350 that includes address data 352 and a routing algorithm 354. The address data 352 may be associated with the north bridge element 310 by the primary controlling bridge 324. The address data 352 may include controlling bridge addresses 356 and a link table 358. The link table 358 may include port group information 360 and MAC addresses 362 corresponding to links, nodes, and port locations. The address data 352 may further include link state information 364, as well as VLAN and logical network assignments 366.

The north bridge element 312 may include address data 370 and a routing algorithm 372. The address data 370 may include controlling bridge addresses 374 and a link table 376. The link table 376 may include port group information 378 and MAC addresses 380. The address data 370 may further include link state information 382. VLAN and logical network assignments 384 may be associated with the north bridge element 312.

The primary controlling bridge 324 may include link and node data 386. The link and node data 386 may include MAC addresses of ports and/or links to be associated with the north bridge elements 308, 310, 312 for routing data frames. The primary controlling bridge 324 may also include at least one associating algorithm 388. The associating algorithm 388 may be used to automatically assign the address data 334, 352, 370 and the routing algorithm(s) 336, 354, 372 to the north bridge elements 308, 310, 312.

The secondary controlling bridge 326 may include link and node data 390, as well as an associating algorithm(s) 392. As with the primary controlling bridge 324, the secondary controlling bridge 326 may be configured to provide one or more of the north bridge elements 308, 310, 312 with routing information 332, 350, 368, including address data 334, 352, 370 and routing algorithms 336, 354, 372.

The controlling bridges 324, 326 may exchange protocol messages with one or more of the north bridge elements 308, 310, 312 and may create and program one or more of the port groups 371, 372. For example, the primary controlling bridge 324 may create the first port group 371 and may exchange Link Aggregation Control Protocol (LACP) messages with the south bridge elements 316, 318, 320, and 322. The primary controlling bridge 324 may further create the second port group 372. The port groups 371, 372 may be associated with bridge elements, VLANs, and/or logical networks, per the routing information. For example, the first port group 371 may be a primary port group for first and second VLANs, and a secondary, or backup, port group for a third VLAN.

In operation, the primary controlling bridge 324 may communicate the routing information 332 to the north bridge element 308. The north bridge element 308 may process and forward each received data frame directly to an appropriate external physical uplink port. For example, the north bridge element 308 may be configured to forward data frames to the south bridge element 316, as indicated by dashed line 303, and to the south bridge element 318, as indicated by dashed line 305.

The north bridge element 310 may be configured to forward data frames to the south bridge element 316, as indicated by dashed line 307. The north bridge element 310 may further be configured to communicate data frames to the south bridge element 318 and the south bridge element 320, as indicated by dashed lines 309 and 311, respectively. The north bridge element 312 may be configured to forward data frames to the south bridge element 322, as indicated by dashed line 313. The north bridge element 308 may thus be configured to forward data frames to the same south bridge element 318 as the north bridge element 310.

The system 300 may be configured to automatically facilitate failover operations. For example, the south bridge element 318 may detect a fault, or failure, associated with the link 319 to the external switch 328. The link failure may include a fault associated with the physical link 319 or the port 335. The south bridge element 318 may inform the primary controlling bridge 324 that the link 319 is faulty. The link 319 is associated with the port group 371. The primary controlling bridge 324 may inform the north bridge elements 308 and 310 that use sub-links in the affected first port group 371 about the failure of the link 319. The south bridge element 318 may optionally notify the north bridge element 308 that its forwarding attempt was unsuccessful. The north bridge elements 308 and 310 may refrain from using the link 319 during subsequent link selection.

In the case of a faulty primary port group 371, the system 300 may failover to a secondary port group 372. For example, a controlling bridge may be configured to take down a port group at a specified operating threshold (e.g., if less than two links are active). The primary controlling bridge 324 may notify all bridge elements 308, 310, 316, 318 associated with the deactivated port group 371 about the external link failure, as well as about the complete port group failure. The secondary port group 372 may become the uplink for reassigned VLANs.

FIG. 3 thus shows a system 300 having distributed bridge elements 308, 310, 312 to independently determine data frame routing. Routing information 332, 350, 368 used to make the independent routing determinations may be provided by a controlling bridge 324, 326. Each data frame may not travel through a common aggregator to be serially processed. The routing and failover processes associated with each data frame may be accomplished at the distributed north bridge elements 308, 310, and 312 in parallel. This parallel processing may facilitate increased throughput.

Figure 4:
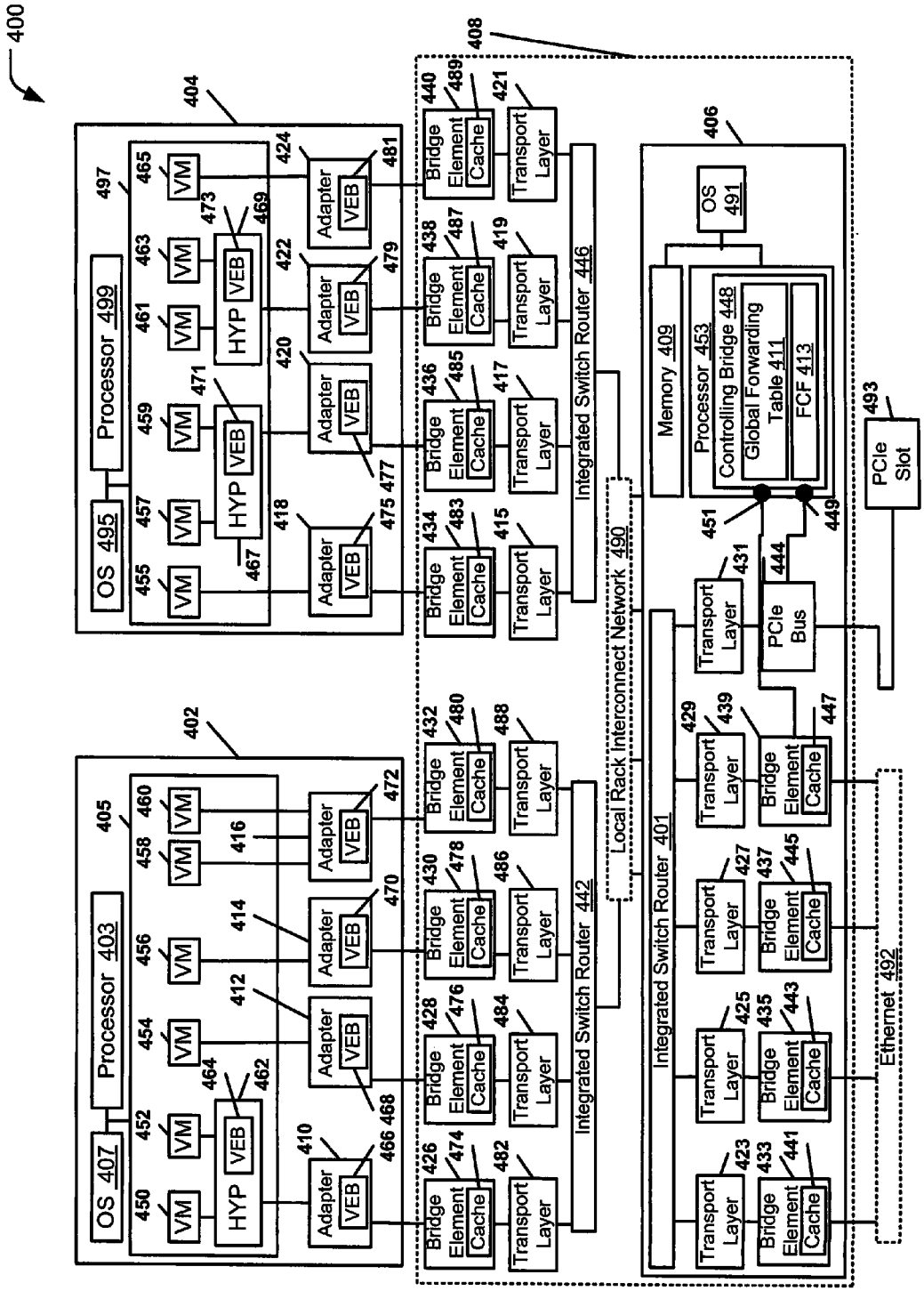
FIG. 4 is a block diagram of a particular embodiment of a system including distributed bridge elements to route data frames.

Referring to FIG. 4, another particular illustrative embodiment of a highly integrated system 400 configured to route data frames using distributed bridge elements is depicted. FIG. 4 generally shows a computer system 400 configured to forward data frames using a distributed virtual bridge 408. The distributed virtual bridge 408 may selectively forward management frames to distributed switches (e.g., bridge elements and adapters).

The distributed virtual bridge 408 may be similar to the distributed virtual bridge 260 of FIG. 2. The system 400 includes a first server computer 402 and a second server computer 404 that are both coupled to an I/O blade device 406 via the distributed virtual bridge 408. The server computers 402, 404 and the I/O blade device 406 may be housed within separate chassis and racks. For example, the server computers 402, 404 and the I/O blade device 406 may correspond respectively to the server computers 210, 220 and the I/O ITE 261 of FIG. 2

The distributed virtual bridge 408 may be coupled to multiple adapters 410, 412, 414, 416, 418, 420, 422, and 424. The adapters 410, 412, 414, 416, 418, 420, 422, and 424 may be located within or may be coupled to the server computers 402, 404. The distributed virtual bridge 408 may use multiple access points, or bridge elements 426, 428, 430, and 432-440 to couple to the server computers 402, 404. For example, a microchip that includes the bridge elements 426, 428, 430, and 432 may be cabled or otherwise coupled to a port of the server computer 402 that includes the adapter 410. As explained herein, the distributed virtual bridge 408 may functionally supplant chassis switches and top of rack switches with a frame-based network fabric that functions in a similar fashion to an Ethernet network.

One or more transport layer modules 482, 484, 486, and 488 coupled to the bridge elements 426, 428, 430, and 432 may provide a frame-based, Ethernet-like interface to one or more integrated switch routers 442. The transport layer module 482 may be configured to deconstruct a transmission of data frames so that packet information may be evenly distributed across links to a local rack interconnect 490. The data frames may not be serialized upon leaving the transport layer module 482. A receiving transport layer module 423 may serialize the data frames to achieve reliable, in-order delivery. If the receiving transport layer module 423 determines that data frame information is missing, the transport layer module 423 may initiate a process to recover the missing data. The translation process may be accomplished in hardware, which may provide a larger bandwidth and faster processing than software applications. The transport layer modules 482, 484, 486, and 488, the integrated switch router 442, and the local rack interconnect network 490 may combine to include an underlying lossless, point-to-point communication network (i.e., an integrated switch router network) between the server computers 402, 404 and the I/O blade device 406.

The bridge elements 426, 428, 430, and 432 may function as data link layer (i.e., Layer 2) bridge forwarders within the distributed virtual bridge 408. In particular embodiments, the bridge elements 426, 428, 430, and 432 may comprise a switch, or router device. The bridge elements 426, 428, 430, and 432 may include learned (e.g., received and stored) cached address data used to forward data frames throughout the distributed virtual bridge 408. The learned address data may correspond to one or both of a destination address and a source address associated with a data frame.

When the bridge element 426 does not include address data pertinent to a source or destination address of a received data frame, the bridge element 426 may query a controlling bridge 448 for the address data. The controlling bridge 448 may include a global forwarding table 411 that includes stored address data. The stored address data may be continuously updated by the bridge elements 426, 428, 430, and 432. For example, a bridge element 426 may send an update message to the controlling bridge 448 in response to learning an updated or new MAC address. A corresponding MAC address in the global forwarding table 411 may be subsequently updated.

Conversely, the address data of the global forwarding table 411 may be used to update the bridge elements 426, 428, 430, and 432. For example, the controlling bridge 448 may respond to a query from the bridge element 426 with requested address data. The bridge element 426 may cache the received address data for future use (e.g., at the forwarding cache 474).

The first server computer 402 may comprise a blade server computer, such as the server computer 206 shown in FIG. 2. The first server computer 402 may include one or more virtual machines (VMs) 450, 452, 454, 456, 458, and 460. A virtual machine may include a software implementation of a computer and may execute programs in a manner similar to a physical machine.

FIG. 4 shows an illustrative hypervisor 462 that is coupled to both the virtual machine 450 and the virtual machine 452. The hypervisor 462 may include platform virtualization software that allows multiple operating systems to run concurrently on the first server computer 402. The hypervisor 462 may include a hypervisor virtual bridge 464 that allows direct communication between the virtual machines 450, 452 without traversal of an external network. In one embodiment, the hypervisor virtual bridge 464 may register address information with the controlling bridge 448.

The first server computer 402 may include at least one processor 403 coupled to a memory 405. The processor 403 may represent one or more processors (e.g., microprocessors), and the memory 405 may represent random access memory (RAM) devices comprising the main storage of the server computer 402, as well as supplemental levels of memory, e.g., cache memories, non-volatile or backup memories (e.g., programmable or flash memories), read-only memories, etc. In addition, the memory 405 may be considered to include memory storage physically located in the first server computer 402 or on another server computer coupled to the server computer 402 via the distributed virtual bridge 408 (e.g., the second server computer 404).

The first server computer 402 may operate under the control of an operating system (OS) 407 and may execute or otherwise rely upon various computer software applications, components, programs, objects, modules, and data structures, such as the virtual machines 450, 452, 454, 456, 458, and 460. Moreover, various applications, components, programs, objects, modules, etc. may also execute on one or more processors in another device coupled to the server computer 402 (e.g., in a distributed computing environment, where computing processes may be allocated to multiple server computers).

The first server computer 402 may include adapters 410, 412, 414, and 416, such as converged network adapters. A converged network adapter may include a single root I/O virtualization (SR-My) adapter, such as a Peripheral Component Interconnect Express (PCIe) adapter that supports Converged Enhanced Ethernet (CEE). Another embodiment of the system 400 may include a multi-root I/O virtualization (MR-IOV) adapter. The adapters 410, 412, 414, and 416 may be used to implement a Fiber Channel over Ethernet (FCoE) protocol. Each adapter 410, 412, 414, and 416 may be coupled to one or more of the virtual machines 450, 452, 454, 456, 458, and 460. The adapters 410, 412, 414, and 416 may facilitate shared access of the virtual machines 450, 452, 454, 456, 458, and 460. While the adapters 410, 412, 414, and 416 are shown in FIG. 4 as being included within the first server computer 402, adapters of another embodiment may include physically distinct devices that are separate from the server computers 402, 404.

Each adapter 410, 412, 414, and 416 may include a converged adapter virtual bridge 466, 468, 470, and 472. The converged adapter virtual bridges 466, 468, 470, and 472 may facilitate sharing of the adapters 410, 412, 414, and 416 by coordinating access by the virtual machines 450, 452, 454, 456, 458, and 460. Each converged adapter virtual bridge 466, 468, 470, and 472 may recognize data flows included within its domain, or addressable space. A recognized domain address may be routed directly, without processing or storage, outside of the domain of the particular converged adapter virtual bridge 466, 468, 470, and 472. Each adapter 410, 412, 414, and 416 may include one or more CEE transmit ports that couple to one of the bridge elements 426, 428, 430, and 432. In another embodiment, bridge elements may be co-located with the adapters, and coupling between adapters and the bridge elements may not be Ethernet connections.

The bridge elements 426, 428, 430, and 432 may be configured to forward data frames throughout the distributed virtual bridge 408. The bridge elements 426, 428, 430, and 432 may thus function as access points for the distributed virtual bridge 408 by translating between Ethernet and the integrated switch router 442. The bridge elements 426, 428, 430, and 432 may not include buffers and may support CEE at boundaries of the distributed virtual bridge 408. In another embodiment, the bridge elements 426, 428, 430, and 432 may include buffers.

Each bridge element 426, 428, 430, and 432 of the distributed virtual bridge 408 may include a forwarding cache 474, 476, 478, and 480. A forwarding cache 474, 476, 478, and 480 may include a lookup table that stores address data used to forward data frames that are received by the bridge elements 426, 428, 430, and 432. For example, the bridge element 426 may compare address data associated with a received data frame to the address data stored within the forwarding cache 474.

Illustrative address data may include routing information, such as a routing key included within header data of the data frame. The routing key may include at least one of a virtual local area network (VLAN) tag and a logical network identifier, as well as a MAC address. The MAC address may be generated and assigned by a Fiber Channel Forwarder (FCF) 413, as set by an administrator or computing system. The Fiber Channel Forwarder 413, or FCoE switch, may facilitate connectivity between FCoE initiators and Fiber Channel fabrics. To illustrate, an FCoE data frame sent from the first virtual machine 458 and intended for a second virtual machine 463 at the second server 404 may be addressed to the Fiber Channel Forwarder 413 in accordance with the FCoE standard. According to standard routing procedures, the Fiber Channel Forwarder 413 may receive and re-address the FCoE data frame for forwarding to the virtual machine 463.

The MAC address of the Fiber Channel Forwarder 413 may have been learned by the first server computer 402 during a discovery phase, when the Fiber Channel Forwarder 413 establishes communications with networked devices. During the discovery phase, the second server computer 404 may respond to broadcast queries from the first server computer 402. The Fiber Channel Forwarder 413 may discover the second server computer 404 from the query responses. After the discovery phase, a login phase may be initiated. A MAC address of the server computer 404 may be reassigned by the Fiber Channel Forwarder 413. The reassigned MAC address may be used for subsequent routing and communications between the server computers 402, 404. The Fiber Channel Forwarder 413 may facilitate storage of MAC addresses assigned to the server computers 402, 404.

A VLAN tag may indicate an assigned VLAN, which may be used to segregate traffic and to allow more than one uplink. There may be multiple VLANs on an uplink. Conventionally, each VLAN may use only one uplink port. That is, only one physical uplink port at a given time may be used to forward a data frame associated with a particular VLAN. Through the use of logical networks, a VLAN may use multiple physical ports to forward traffic while maintaining traffic segregation. Link aggregation may be used to bundle several physical links to act as one uplink with higher bandwidth.

A logical network may include a logically specified network portion of the distributed virtual bridge 408. Multiple logical networks may be included within a single bridge element. As such, a logical network may provide an additional layer of traffic separation. When so configured, logical networks may allow different customers to use the same VLAN tag. The VLANs of each customer may remain segregated by virtue of the different logical networks.

The forwarding caches 474, 476, 478, and 480 of the distributed virtual bridge 408 may have a format similar to the global forwarding table 411 of the controlling bridge 448. The forwarding caches 474, 476, 478, and 480 may have smaller memory capacities than the global forwarding table 411. The forwarding caches 474, 476, 478, and 480 may further be updated with address data learned from data frames that flow through the bridge elements 426, 428, 430, and 432.

The address data may additionally be updated with address data received from the global forwarding table 411. Invalid or changed address data that is updated within one or more of the forwarding caches 474, 476, 478, and 480 of the bridge elements 426, 428, 430, and 432 may be communicated to the global forwarding table 411 of the controlling bridge 448. For example, the bridge element 426 may learn a new MAC address of a newly added device that is configured to receive from or send data to the distributed virtual bridge 408.

The bridge element 426 may verify that a source MAC address included within a received data frame is allowed at a port by checking a list stored within a memory. The bridge element 426 may send a registration message to the controlling bridge 448 to update the global forwarding table 411 with the verified MAC address. The bridge element 426 may further store the MAC address within the forwarding cache 474. In another example, the bridge element 426 may identify a MAC address that is infrequently used. This infrequently used MAC address may be removed from the forwarding cache 474 to make storage room available for other MAC addresses. The bridge element 426 may send an update message to the controlling bridge 448 to have the MAC address removed from the global forwarding table 411.

Address data stored within the global forwarding table 411 may be communicated to one or more forwarding caches 474, 476, 478, and 480 of the distributed virtual bridge 408. For example, the bridge element 426 may receive a data frame that includes a destination MAC address that is not stored within the forwarding cache 474. To obtain information for forwarding the data frame, the bridge element 426 may send a query to a bridge element 439 configured to access the controlling bridge 448. The bridge element 439 may search the global forwarding table 411 for address data associated with the destination MAC address. If the address data is found, the bridge element 439 may forward the MAC address through the distributed virtual bridge 408 to the querying bridge element 426. The bridge element 426 may store the MAC address as address data within the forwarding cache 474. As with the global forwarding table 411, the address data included within the forwarding caches 474, 476, 478, and 480 of the distributed virtual bridge 408 may include both internal address information, as well as addresses that are external to the system 400.

Each of the bridge elements 426, 428, 430, and 432 may be connected to one or more transport layer modules 482, 484, 486, and 488. The transport layer modules 482, 484, 486, and 488 may include buffering used for attachment to the integrated switch router 442. The transport layer modules 482, 484, 486, and 488 may further provide a frame-based, Ethernet-like interface to the integrated switch router 442.

The transport layer modules 482, 484, 486, and 488 may each include a shared buffer used to transmit frames across the integrated switch router 442. Additional buffers of the transport layer modules 482, 484, 486, and 488 may be used to receive data frames from the integrated switch router 442. The buffers may be divided into different virtual lanes. Virtual lanes may include logically separated paths for data frame traffic flowing between a bridge element and a transport layer module. For example, there may be four virtual lanes between the bridge element 426 and the transport layer module 482. The virtual lanes may correspond to differently prioritized traffic. The transport layer modules 482, 484, 486, and 488 may include logic to recover from faulty microchips and links between a source and a destination. The transport layer modules 482, 484, 486, and 488 may maintain a strict ordering of packets within a particular virtual lane regardless of each data frame's path through the local rack interconnect network 490 and the computer system 400.

The integrated switch router 442 may communicate with the transport layer modules 482, 484, 486, and 488 and may facilitate routing and packet delivery to and from the local rack interconnect network 490. The local rack interconnect network 490 may include links to the bridge elements 426, 428, 430, and 432 located within the same chassis and rack, as well as links to the bridge elements 434-440 in different chassis and racks. The local rack interconnect network 490 may include point-to-point connections, or pipes, between the bridge elements 426, 428, 430, 432, and 433-440 of the distributed virtual bridge 408 with no frame loss and with in-order frame delivery.

The second server computer 404 may include a server computer similar to the first server computer 402 and may be similar to the server computer 206 of FIG. 2. As such, the second server computer 404 may be located within a different chassis and rack than the first server computer 402. The first server computer 402, the second server computer 404 may include a processor 499 coupled to a memory 497 and to an operating system 495. The second server computer 404 may further include virtual machines 455, 457, 459, 461, 463, and 465.

A hypervisor 467 may be coupled to the virtual machines 457, 459. The hypervisor 467 may include a hypervisor virtual bridge 471 that allows direct communication between the virtual machines 457, 459. A hypervisor virtual bridge 473 of a hypervisor 469 coupled to the virtual machines 461, 463 may facilitate direct communication between the virtual machines 461, 463. For example, the hypervisor virtual bridges 471, 473 may register address data with the controlling bridge 448.

The second server computer 404 may also include one or more adapters 418, 420, 422, and 424, such as converged CEE network adapters. Each adapter 418, 420, 422, and 424 may be coupled to one or more of the virtual machines 455, 457, 459, 461, 463, and 465. The adapters 418, 420, 422, and 424 may each include a converged adapter virtual bridge 475, 477, 479, and 481. The converged adapter virtual bridges 475, 477, 479, and 481 may facilitate sharing of the adapters 418, 420, 422, and 424 by coordinating virtual machine access. The adapters 418, 420, 422, and 424 may each couple to one or more of the bridge elements 434, 436, 438, and 440 of the distributed virtual bridge 408. Each adapter 418, 420, 422, and 424 may include one or more CEE transmit ports that couple to one of the bridge elements 434, 436, 438, or 440.

Each bridge element 434, 436, 438, and 440 may include a forwarding cache 483, 485, 487, and 489 that includes address data used to forward data frames that are received by the bridge elements 434, 436, 438, and 440. The bridge elements 434, 436, 438, and 440 may each be connected to one or more transport layer modules 415, 417, 419, and 421. The transport layer modules 415, 417, 419, and 421 may include buffering used for the attachment to the integrated switch router 446. The transport layer modules 415, 417, 419, and 421 may further provide a frame-based, Ethernet-like interface to the integrated switch router 446 and may maintain packet ordering. A portion of the distributed virtual bridge 408 shown in FIG. 4 as located above the local rack interconnect network 490 and as associated with the server computers 402, 404 may be referred to as a north portion. The north bridge elements 426, 428, 430, 432, 434, 436, 438, and 440 may be coupled to the adapters 410, 412, 414, 416, 418, 420, 422, and 424.

The I/O blade device 406 may be the I/O server computer 258 of FIG. 2. As such, the I/O blade device 406 may allow uplink connectivity to an external Ethernet network 492 via an integrated switch router 401 that is coupled to transport layer modules 423, 425, 427, 429, and 431.

The transport layer modules 423, 425, 427, 429, and 431 may each couple to a bridge element 433, 435, 437, and 439. The bridge elements 433, 435, 437, and 439 may each include a forwarding cache 441, 443, 445, and 447. The I/O blade device 406 may be categorized as being included within a south portion of the distributed virtual bridge 408 because the bridge elements 433, 435, 437, and 439 may be coupled to an uplink to the Ethernet network 492.

The I/O blade device 406 may include a memory 409, an operating system 491, and a processor 453 that includes the controlling bridge 448. The bridge element 439 may be coupled to the processor 453 via an Ethernet link connection. The transport layer module 431 may be coupled to a PCIe bus 444 that is coupled via a PCIe link connection to the processor 453 and the controlling bridge 448. The PCIe bus 444 may also be coupled to a PCIe slot 493. The processor 453 may further include a Peripheral Component Interconnect Manager (PCIM) 451.

The controlling bridge 448 may communicate with the bridge elements 426, 428, 430, and 432-440 and other controlling bridges (not shown) of the computer system 400. The controlling bridge 448 may include firmware executing on the processor 453 that manages the bridge elements 426, 428, 430, and 432-440. For example, the controlling bridge 448 may be configured to divide a workload between the bridge elements 426, 428, 430, and 432-440, as well as perform synchronization procedures and failover operations.

The controlling bridge 448 may be configured to interface with and program the bridge elements 426, 428, 430, 432-440 and the adapters 466, 468, 470, 472, 475, 477, 479, 481. More particularly, the controlling bridge 448 may be configured to generate and send a management frame to one or more of the bridge elements 426, 428, 430, 432-440 and the adapters 466, 468, 470, 472, 475, 477, 479, 481. The management frames may include instructions used to program operating parameters of the bridge elements 426, 428, 430, 432-440 and the adapters 466, 468, 470, 472, 475, 477, 479, 481 and other switches.

The controlling bridge 448 may include the Fiber Channel Forwarder 413. FCoE may offer the capability to transport fiber channel payloads on top of an Ethernet network. The Fiber Channel Forwarder 413 may execute the Fiber Channel Initialization Protocol to discover and initialize FCoE capable entities connected to an Ethernet cloud. The Fiber Channel Forwarder 413 may further include firmware that encapsulates and de-encapsulates Fiber Channel data frames (e.g., FCoE formatted data frames). In at least one embodiment, the Fiber Channel Forwarder 413 may translate between Ethernet and Fiber Channel protocols.

The controlling bridge 448 may additionally include the global forwarding table 411. The global forwarding table 411 may include address data (e.g., MAC addresses) that is registered and maintained through communication and cooperation with the bridge elements 426, 428, 430, and 432-440, and in some cases, the hypervisors 462, 467, and 469.

In one example, the global forwarding table 411 may maintain MAC addresses that have been learned by a bridge element 426. The bridge element 426 may register the address data with the controlling bridge 448. The controlling bridge 448 may update the global forwarding table 411 by adding the address data to the global forwarding table 411. Similarly, the bridge element 426 may cause the controlling bridge 448 to update the global forwarding table 411 by sending an update message to the controlling bridge 448. The update message may cause the controlling bridge 448 to delete a MAC address that has been aged out by the bridge element 426. A MAC address may further be deleted when the bridge element 426 has detected that the address data is no longer valid.

In another example, the hypervisor virtual bridge 464 may register MAC addresses or other address data with the controlling bridge 448. The global forwarding table 411 may include address data associated with addresses that are included within the system 400, as well as addresses that are external to the system 400.

Figure 5:
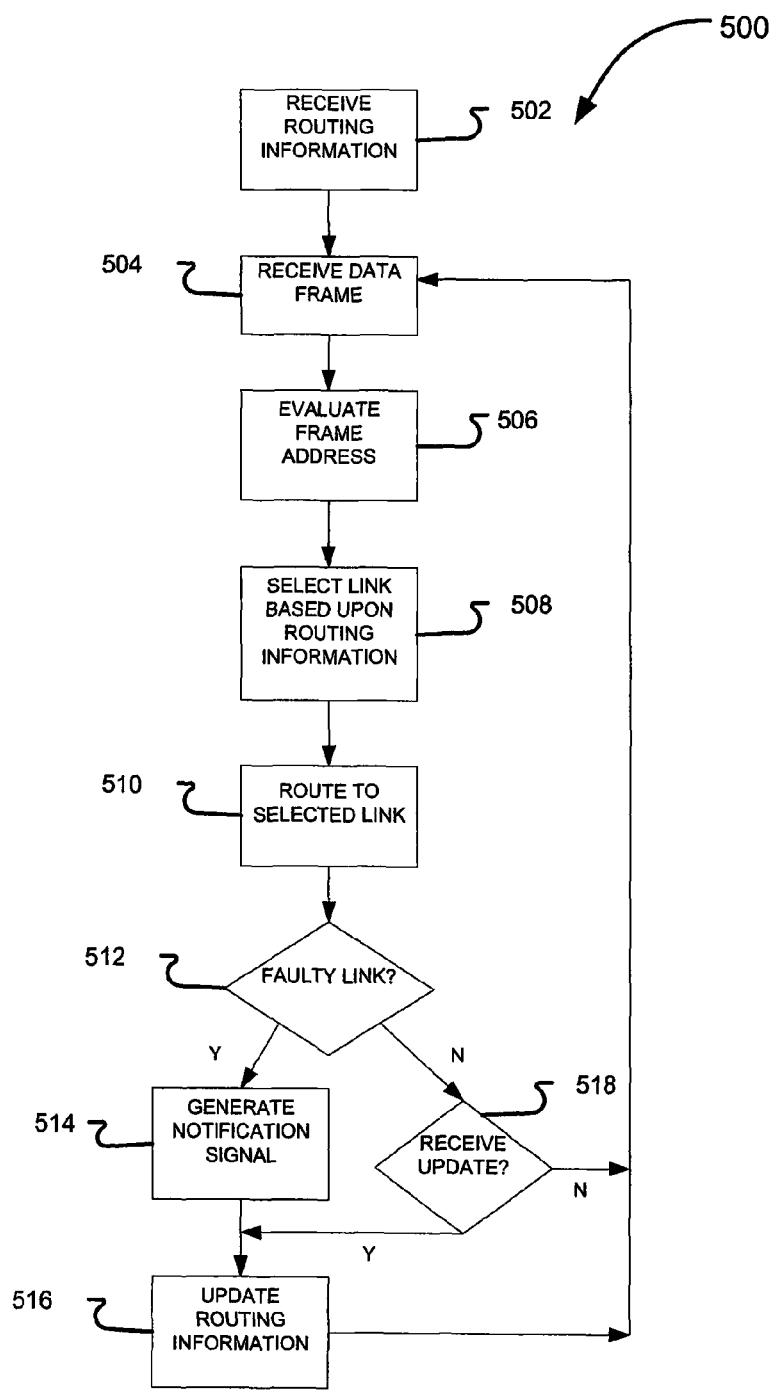
FIG. 5 is a flow diagram of a particular embodiment of a method of routing a data frame using a distributed bridge element.

FIG. 5 shows a method of 500 routing a data frame using a distributed bridge element. The method 500 may be performed by a distributed bridge element, such as the north bridge element 308 of FIG. 3.

At 502, routing information may be received. For example, the north bridge element 308 may receive the routing information 332 from the primary controlling bridge 324. The routing information 332 may be used to automatically distribute data frames received at the north bridge element 308. A data frame may be received, at 504. For instance, the north bridge element 308 may receive a data frame from the server computer 302 of FIG. 3. At 506, the frame address may be evaluated. For example, the north bridge element 308 may evaluate an address of a received data frame. The received data frame may include a source address and a destination address.

A link may be selected based upon the routing information and the frame address, at 508. For instance, the north bridge element 308 may select the link 317 or port 333 based upon the routing information 332 and the data frame address data. At 510, the data frame may be routed to the selected link. For instance, the north bridge element 308 may route the data frame to the link 317 based on the routing algorithm 336.

A faulty link may be detected at 512. For example, the south bridge element 316 may determine that the link 317 or the port 333 has failed or is otherwise faulty. When a faulty link has been detected, a notification signal may be generated, at 514. For example, the south bridge element 316 may generate a notification signal. The notification signal may be sent to the primary controlling bridge 324. A notification signal may additionally be sent to the north bridge element 308.

At 516, the routing information may be updated. For instance, the north bridge element 308 may update the routing information 332 in response to receiving the notification signal. When an update is received at 518, the routing information may be updated, at 516. For example, the north bridge element 308 may update the routing information 332. The updated routing information may be used to route a next received data frame, at 504.

FIG. 5 thus shows a method 500 of routing data frames at a bridge element using routing information received from a controlling bridge. The routing information may be updated to reflect changes in a system. The method 500 may facilitate distributed forwarding processes in a manner that increases routing efficiency. Increased efficiencies may enable greater scalability and accuracy in highly integrated environments.

Figure 6:
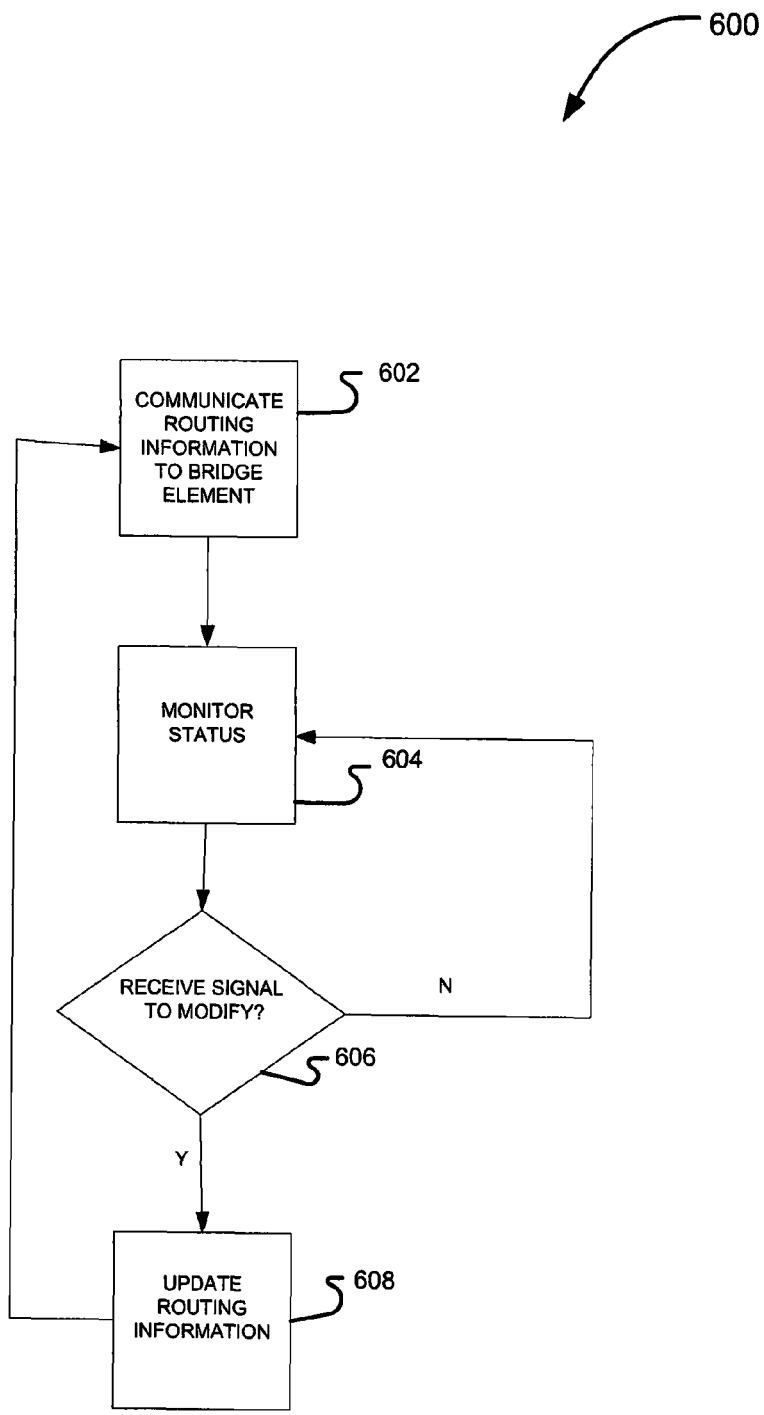
FIG. 6 is flow diagram of a particular embodiment of a method of programming a bridge element to independently distribute data frames.

FIG. 6 includes a method 600 of programming a bridge element to independently distribute data frames. The method 600 may be accomplished by a controlling bridge, such as the primary controlling bridge 324 of FIG. 3.

At 602, routing information may be communicated to a bridge element. For example, the primary controlling bridge 324 of FIG. 3 may communicate routing information 332 to the bridge element 308.

A controlling bridge may monitor a status of a link or node, at 604. For instance, the primary controlling bridge 324 of FIG. 3 may monitor a status of system components corresponding to the link and node data 386.

At 606, a signal to modify a status of a link or node may be received. For example, the primary controlling bridge 324 of FIG. 3 may receive a notification signal from a south bridge element 316. The notification signal may indicate that a link 317 or a port 333 is faulty. In response to a received signal at 606, routing information may be updated at 608. For example, the primary controlling bridge 324 of FIG. 3 may update the link and node data 386 and/or associating algorithm 388. The primary controlling bridge 324 may communicate the updated routing information 332, 350 to affected bridge elements 308, 310.

FIG. 6 thus shows a method 600 of providing routing information to a distributed bridge element configured to independently route data frames. A controlling bridge may monitor the operation of system components to provide failover processes and routing updates. The method 600 may facilitate automated programming in a manner that reduces administrator workload. Increased programming efficiencies may facilitate system adaptability and routing efficiency.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. An apparatus comprising:
a plurality of racks, wherein each rack of the plurality of racks includes a plurality of chassis, wherein each chassis of the plurality of chassis includes a plurality of server computers;
a distributed virtual bridge coupled to the plurality of server computers, wherein the distributed virtual bridge is coupled to a plurality of adapters and the plurality of adapters is located within, coupled, or any combination thereof to the plurality of server computers, and wherein the distributed virtual bridge comprises:
a plurality of bridge elements coupled to the plurality of server computers, wherein the plurality of bridge elements are each configured to selectively forward a plurality of data frames according to routing information to server computers of different racks of the plurality of racks, different chassis of the plurality of chassis, or any combination thereof; and
a controlling bridge coupled to the plurality of bridge elements and configured to provide the routing information to the plurality of bridge elements.

2. The apparatus of claim 1, wherein the routing information includes at least one of a routing algorithm and address data.

3. The apparatus of claim 2, wherein a bridge element of the plurality of bridge elements executes the routing algorithm to select an address of a plurality of addresses associated with at least one of a link, a port, and a node configured to receive a data frame of the plurality of data frames.

4. The apparatus of claim 1, wherein a bridge element of the plurality of bridge elements includes a table storing a plurality of addresses associated with at one of a link, a port, and a node configured to receive the data frames.

5. The apparatus of claim 1, wherein a bridge element of the plurality of bridge elements includes a table comprising a plurality of addresses associated with at least one group comprising a plurality of ports.

6. The apparatus of claim 1, wherein a bridge element of the plurality of bridge elements includes a link status table comprising an operational status of a plurality of addresses associated with at one of a link, a port, and a node configured to receive the data frames.

7. The apparatus of claim 1, wherein a bridge element of the plurality of bridge elements of the distributed virtual bridge is configured to detect a faulty link coupled to the bridge element and notify the controlling bridge element of the faulty link.

8. The apparatus of claim 1, wherein the controlling bridge is configured to communicate a faulty status of a link to the plurality of bridge elements.

9. The apparatus of claim 1, wherein the controlling bridge is configured to assign to each bridge element of the plurality of bridge elements at least one of a link, a port, and node to receive the plurality of data frames.

10. The apparatus of claim 1, wherein the routing information includes a faulty status of at least one of a link, a port, and a node.

11. The apparatus of claim 1, further comprising an integrated switch router configured to route the plurality of data frames and a transport layer module coupled to a bridge element of the plurality of bridge element, wherein the transport layer module is configured to provide a frame-based interface to the integrated switch router.

12. The apparatus of claim 1, wherein the routing information includes at least one of a virtual local area network identifier and a port group identifier.

13. A method of routing a data frame, the method comprising:
for a plurality of racks, wherein each rack of the plurality of racks includes a plurality of chassis, wherein each chassis of the plurality of chassis includes a plurality of server computers, generating a plurality of management frames at a controlling bridge of a distributed virtual bridge, wherein the management frames include routing information, wherein the distributed virtual bridge is coupled to the plurality of server computers, wherein the distributed virtual bridge is coupled to a plurality of adapters and the plurality of adapters is located within, coupled, or any combination thereof to the plurality of server computers; and communicating the plurality of management frames to a plurality of bridge elements of the distributed virtual bridge coupled to the plurality of server computers, wherein the plurality of bridge elements are each configured to selectively forward a plurality of data frames according to the routing information to server computers of different racks of the plurality of racks, different chassis of the plurality of chassis, or any combination thereof.

14. The method of claim 13, further comprising automatically assigning a link to a bridge element of the plurality of bridge elements.

15. The method of claim 13, further comprising automatically assigning at least one of a virtual local area network and a port group to a bridge element of the plurality of bridge elements.

16. The method of claim 13, further comprising receiving status information indicative of a status of a link from a bridge element of the plurality of bridge elements.

17. The method of claim 13, further comprising communicating a management frame that includes updated routing information to a bridge element of the plurality of bridge elements.

18. The method of claim 13, wherein the routing information includes at least one of a routing algorithm and address data.

19. The method of claim 13, further comprising automatically disassociating a link with a bridge element of the plurality of bridge elements.

20. A program product, comprising:
program code executable at a controlling bridge of a distributed virtual bridge, for a plurality of racks, wherein each rack of the plurality of racks includes a plurality of chassis, wherein each chassis of the plurality of chassis includes a plurality of server computers, wherein the distributed virtual bridge is coupled to the plurality of server computers, wherein the distributed virtual bridge is coupled to a plurality of adapters and the plurality of adapters is located within, coupled, or any combination thereof to the plurality of server computers, to generate a plurality of management frames that include routing information and to communicate the plurality of management frames to a plurality of bridge elements of the distributed virtual bridge coupled to the plurality of server computers, wherein the plurality of bridge elements are each configured to selectively forward a plurality of data frames according to the routing information to server computers of different racks of the plurality of racks, different chassis of the plurality of chassis, or any combination thereof; and
a computer readable non-transitory storage medium bearing the program code.

* * * * *